(12) United States Patent
Barmakian et al.

(10) Patent No.: US 6,412,431 B1
(45) Date of Patent: Jul. 2, 2002

(54) COMPOSITE FENDER

(76) Inventors: Andrew Barmakian, 1485 S. Willow Dr., Rialto, CA (US) 92376; Bruce B. Barmakian, 10909 Rollins Ct., Alta Loma, CA (US) 91701

( * ) Notice: Subject to any disclaimer, the term of this patent is extended or adjusted under 35 U.S.C. 154(b) by 0 days.

(21) Appl. No.: 09/664,281

(22) Filed: Sep. 18, 2000

Related U.S. Application Data

(63) Continuation-in-part of application No. 09/360,281, filed on Jul. 22, 1999, now Pat. No. 6,244,014.

(51) Int. Cl.[7] .............................................. B63B 59/02
(52) U.S. Cl. ........................ 114/219; 405/212; 405/215
(58) Field of Search .......................... 114/219; 405/212, 405/215; 14/76

(56) References Cited

U.S. PATENT DOCUMENTS

| 3,828,715 | A | | 8/1974 | Matsushita |
| 3,912,325 | A | * | 10/1975 | Sudyk |
| 4,875,322 | A | | 10/1989 | Rozzi |
| 5,174,221 | A | * | 12/1992 | Enami et al. |
| 5,361,715 | A | * | 11/1994 | Kiedaisch et al. |
| 5,766,711 | A | * | 6/1998 | Barmakian |
| 6,045,346 | A | | 4/2000 | Barmakian ................. 425/117 |

FOREIGN PATENT DOCUMENTS

DE 4217934 12/1993
EP 0894899 3/1999

OTHER PUBLICATIONS

Fentek Marine Fendering Systems, Wharf and Harbour Installations; pp. 11, 15 and 2 un–numbered pages, 1999.

* cited by examiner

*Primary Examiner*—Sherman Basinger
(74) *Attorney, Agent, or Firm*—Sheldon & Mak

(57) ABSTRACT

A composite fender panel for protecting a harbor structure includes a resilient body member having a front surface and a rear mounting surface spaced by a panel thickness from a main portion of the front surface. Encapsulated within the body member is a cage frame including a frame having a plurality of intersecting beams of uniform cross-section including front and rear flange portions and a connecting web portion, at least some of the flange portions forming respective front and rear faces of the frame; a grid of steel reinforcing rods having gripping projections formed thereon, the rods also having a nominal cross-sectional diameter being not more than 10 percent of the panel thickness, a first plurality of the rods being welded to the front face of the frame, a second plurality of the rods having welded connections to the first rods in spaced relation opposite the front face of the frame; and an attachment structure defining a spaced plurality of attachment elements formed in respective boss members, each of the boss members being rigidly connected between respective front and rear flanges of one of the beams.

47 Claims, 7 Drawing Sheets

COMPOSITE FENDER

RELATED APPLICATION

This application is a continuation-in-part of application Ser. No. 09/360,281, filed on Jul. 22, 1999, now U.S. Pat. No. 6,244,014, which is incorporated herein by this reference.

BACKGROUND

The present invention relates to cushioning devices for wharfs and docks to which shipping vessels are docked at shipping terminals.

A prior art fender installation on a vertically oriented stationary wharf face includes one or a vertically spaced plurality of resilient support members to which is fastened a plate having resilient tiles thereon. In one configuration, each support member is a conically shaped molding having steel flange reinforcements at opposite ends and having openings therein for receiving threaded fasteners. In another configuration, the support members have generally V-shaped configuration including a pair of diverging vertically oriented flexible web portions diverging from proximate the plate and having respective outwardly projecting flanges that are fastened -to the wharf face. Such devices provide resilient lateral support for large ships. However, they exhibit a number of disadvantages. For example:

1. They are expensive to provide in that the resilient tiles require a large number of fasteners for anchoring to the plates;
2. The plates and fasteners are subject to corrosion;
3. The plates are excessively heavy and/or insufficiently strong for resisting expected side loading, particularly at corners of the plates.

Thus there is a need for a composite fender that overcomes the disadvantages of the prior art.

SUMMARY

The present invention meets this need by providing a fender panel and assembly that is particularly effective in protecting wharfs from damage by passing or docking ships. In one aspect of the invention, the fender panel includes a resilient body member having a front surface and a rear mounting surface; and a cage frame encapsulated within the body member, the cage frame including an attachment structure connected to plural spaced apart locations of the cage frame, the attachment structure defining a spaced plurality of attachment elements for connecting to supporting structure. The cage frame is spaced from the front face by not less than 10 percent of a panel thickness of the body member between the front face and the rear mounting surface for cushioning the impact of contacting ship hulls. The cage frame preferably includes a grid of rod members for forming a light-weight, high-strength matrix reinforcement of the body member.

The rod members of the cage frame can be steel reinforcing rods having gripping projections formed thereon. Preferably the rod members have a nominal cross-sectional diameter that is not more than 10 percent of the panel thickness for efficient utilization of the steel material. Preferably the grid of the cage-frame has welded connections at respective intersections thereof for enhanced rigidity. The grid can be a front grid, the cage frame further including a rear grid of rod members and a spacer structure connecting portions of the grids in rigidly spaced relation.

The attachment structure can be rigidly connected to the spacer structure, and can include a plate member having respective fastener openings extending through the plate member to form the attachment elements. The plate member can be parallel-spaced from the mounting surface, the attachment structure also including a plurality of tubular spacers extending between the plate member and the mounting surface in alignment with the fastener openings for receiving corresponding threaded fasteners. The spacer structure can be a rectangular frame having pairs of side and end frame members, and the plate member can be welded between the side frame members. The frame members can be formed having a uniform cross-section including spaced pairs of flange portions and connecting web portions, the flange portions forming front and rear faces of the frame.

The grids can include respective pluralities of lateral and longitudinal rods, with some of the lateral rods being connected to the side frame members, and the longitudinal rods being connected to the lateral rods in spaced relation opposite the frame.

The front surface can include a planar main portion and a tapered perimeter portion, a cushion thickness of the resilient body between the main portion of the front surface and the cage frame preferably being at least 30 percent of the panel thickness for enhanced cushioning of impacting vessel hulls. Regardless of the panel thickness the cushion thickness is preferably at least 0.15 meters. Preferably, the resilient body consists of a main polymeric component and an additive component, the main polymeric component being low-density polyethylene of which at least 35 percent is linear low-density polyethylene for preventing cracking and preserving uninterrupted coverage of the cage frame by the resilient body, the additive component including an effective amount of an ultraviolet inhibitor. Preferably the main polymeric component is at least 90 percent of the resilient body, the resilient body including not more than 5 percent by weight of high-density polyethylene. It is also preferable that the main polymeric component be at least 65 percent linear low-density polyethylene.

The cage frame can include a frame having pluralities of first and second beams that are rigidly connected in orthogonal relation, and the cage frame can include the grid of first and second rod members wherein the first rod members are connected between the second rod members and a front face of the frame. The first and second beams can be joined in coplanar relation. The at least some of the second beams can be segmented with each segment extending between a pair of the first beams. The beams can each be formed having a uniform cross-section including front and rear flange portions and a connecting web portion, the flange portions forming respective front and rear faces of the frame.

The attachment elements can be formed in respective boss members that are rigidly connected between respective front and rear flanges of one of the beams. The boss members can be threaded for engaging threaded fasteners. Preferably each of the boss members projects rearwardly from the rear flanges of the beams for reinforcing respective threaded fastener. More preferably, the boss members are formed of corrosion resistant steel and extend flush with the rear mounting surface of the body member for enhancing the reinforcement and for preventing corrosion in case of water leakage between the support and the rear mounting surface of the composite fender panel.

Alternatively, the boss members can be spaced from the mounting surface with a passage being formed for the fastener between the boss member and the mounting surface whereby, when the fasteners are tightened against a support that contacts the mounting surface, the body member is compressed about the fasteners between the mounting surface and the bosses for sealing same. Also, or in the alternative, the boss members can be formed with passages therethrough for receiving threaded fasteners, a cavity being formed between the boss and the front surface of the resilient body for receiving a head of the fastener and a plug for encapsulating the head of the fastener.

The frame can include front and a rear portions that are connected in parallel-spaced relation by a plurality of third beams for imparting added strength to the cage frame.

A composite fender assembly can be formed from the composite fender panel and a resilient support member for mounting the fender panel in resiliently spaced relation to a wharf face, the support member having a plurality of threaded fastener cavities formed in a support surface thereof, the fender panel being attached by a plurality of threaded fasteners that connect respective fastener elements of the fender panel to the support member for rigidly holding the mounting surface of fender panel against the support surface of the support member. The resilient body can be initially formed with head cavities extending between respective fastener openings and the front face, the head cavities being tapered continuously inwardly between the front face and the fastener elements, a resilient plug member being subsequently sealingly bonded within the cavity and forming a portion of the front face. The plug member can adhesively bonded or thermally fused within the cavity.

In another variation, the fastener elements can be formed as threaded openings in the attachment,structure for engaging corresponding ones of the threaded fasteners when there is access to heads of the fasteners opposite a flange of the support member.

In another aspect of the invention, a method for forming a composite fender panel includes:

(a) forming a cage frame including a spaced plurality of attachments; and (b) encapsulating the cage frame in a resilient material forming a resilient body having a front surface and a rear mounting surface, the resilient material being formed for accessing the attachment elements.

The method can further include providing an openable mold assembly having front and rear mold elements for respectively defining the front surface and the rear mounting surface, and supporting the cage frame within the mold assembly by a plurality of threaded fasteners engaging respective ones of the fastener openings. The fastener openings can be threaded, the fasteners threadingly engaging the fastener openings during the encapsulating:

The cage frame can include the grid of reinforcing rods on a front face of the frame, with first rods being connected to the front face and second rods connected to front edges of the first rods. The cage frame can include the frame having intersecting beam members, and the attachment elements can have respective fastener openings.

The method can further include, prior to the encapsulating, assembling respective spacer sleeves against the frame in registration with corresponding ones of the fastener openings, the spacer sleeves being encapsulated flush with the mounting surface in the encapsulating of the cage frame. Also or alternatively, the encapsulating includes forming respective passages extending from the mounting surface to the fastener openings. Also, the encapsulating can include forming respective head cavities in the body between the front surface and the fastener openings for accessing the fastener openings.

The invention also provides a method for making a composite protective fender assembly, including forming the composite fender panel; providing a resilient support member having a plurality of threaded fastener cavities formed in a supporting surface thereof; fastening the fender panel against the supporting surface using headed fasteners extending from respective head cavities, through the mounting plate, and into engagement with corresponding ones of the threaded cavities; and sealingly filling the head cavities using respective resilient plug members.

DRAWINGS

These and other features, aspects, and advantages of the present invention will become better understood with reference to the following description, appended claims, and accompanying drawings, where:

DESCRIPTION

Figure 4:
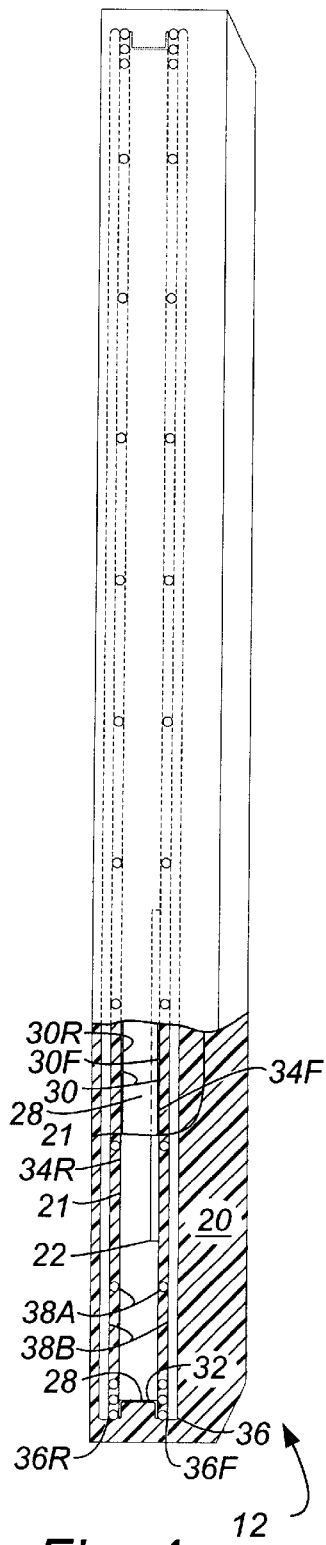
FIG. 4 is a side view showing the fender panel of FIG. 1 cut away as in FIG. 3.

The present invention is directed to a composite fender that is particularly suited for protecting wharfs and other structures at and in the vicinity of shipping terminals. With reference to FIGS. 1–5 of the drawings, a fender assembly 10 includes a composite fender panel 12 that is spaced from a wharf face 14 by a resilient support 16. According to the present invention, the fender panel 12 includes a cage-frame 18 that is encapsulated within a resilient body 20. In an exemplary configuration, the cage-frame 18 incorporates a rectangular frame 21 having grid reinforcements on opposite faces as described below, the frame 21 including a plate 22 having fastener openings 24 therein for attachment by respective threaded fasteners 25 to the support 16 as also described below. Opposite edges of the plate 22 are welded to a pair of longitudinal frame members 26 which can be channel members as shown in FIG. 3, the channel members each having an inwardly facing web 28 and outwardly facing flanges 30 that are individually designated front flange 30F and a rear flange 30R. A pair of cross members 32 are welded to opposite ends of the frame members 26, the cross members 32 having counterparts of the web 28 and the flanges 30 as best shown in FIG. 4, being formed of the same material, the frame 21 having respective front and rear faces 34F and 34R, the plate 22 being flush with the front face 34F.

Figure 1:
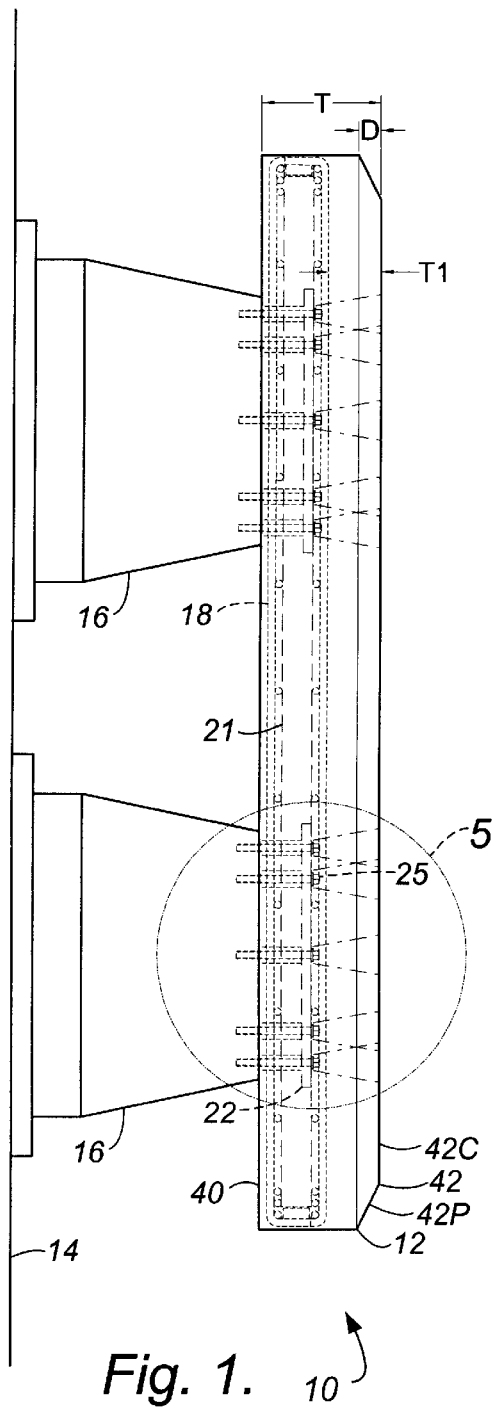
FIG. 1 is a side elevation view of a fender assembly including a composite fender panel according to the present invention.

The cage-frame 18 also includes at least one grid 36 of reinforcing members 38 including a plurality of lateral reinforcing members 38A and a plurality of longitudinal reinforcing members 38B. Preferably a front grid 36F is located against the front face 34F and a rear grid 36R is located against the rear face 34R of the frame 21, the lateral reinforcing members 38A being welded directly to the frame members 26 at a spacing S1, the longitudinal reinforcing members 38B having a spacing S2 and being welded to opposite sides of the lateral reinforcing members 38A in spaced relation to the frame 21. The lateral and longitudinal reinforcing members 38A and 38B are preferably formed of steel reinforcing bar, commonly known "re-bar", which has a ribbed surface configuration that facilitates the transfer of shear loading between the members 38 and an encapsulating medium. Also, opposite ends of the reinforcing members 38 can be formed at right-angles to extend between the front and rear flanges 30F and 30R of the frame members 26 and the cross members 32, thereby augmenting the structural integrity of the encapsulating resilient body 21 as best shown in FIGS. 1 and 3. It will be understood that separate lengths of reinforcing material can be attached between the flanges 30F and 30R in place of formed extensions of the reinforcing members 38.

The cage-frame 18, which is typically a welded assembly, is encapsulated in a polymeric material that does not form voids and cracks due to tensile thermal strains being generated during solidification. A particularly suitable composition for forming the plastic body 14 as an uninterrupted covering of the cage-frame 18 is disclosed in this inventor's U.S. Pat. No. 6,244,014. Initially, and prior to assembly with the resilient support 16, the body 20 is formed with respective conically shaped cavities 46 extending from the front surface 42 to the plate 22 in regions surrounding the fastener openings 24, the cavities being subsequently filled as described below. The composition includes a main first quantity of low density polyethylene of which at least 35 percent and preferably 65 percent is linear low-density polyethylene (LLDPE), the balance being regular low-density polyethylene (LDPE), and a process additive second quantity including an effective amount of UV inhibitor, the composition not having any significant volume of filler material such as calcium carbonate. Preferably, the first quantity is at least 90 percent of the total volume of the plastic body 14, approximately 5 percent of the total volume being a mixture of coloring, foaming agent, and UV inhibitor. Preferably the composition is substantially free (not more than 5 percent) of high density polyethylene.

Thus the composition of the resilient body 20 has polymeric elements being preferably exclusively polyethylene as described above (substantially all being of low-density and mainly linear low-density), together with process additives as described below. As used herein, the term "process additive" means a substance for enhancing the properties of the polymeric elements, and does not include filler material such as calcium carbonate. The composition preferably contains a process additive which can be a foaming or blowing agent in an amount of up to about 0.9% by weight to insure than when the plastic body 14 is made by extruding the plastic composition into a mold, the mold is completely filled. The foaming agent can be a chemical blowing agent such as azodicarbonamide. A suitable chemical blowing agent is available from Uniroyal of Middlebury, Conn., under the trade name Celogen AZ 130.

Other process additives of the composition can include a coupling agent, preferably a silane, for improved bonding between the plastic body 14 and the cage 12.

The plastic composition can also include a fungicide, typically in an amount of about 0.25% by weight, and an emulsifier, in an amount of from about 0.1% to 0.3% by weight. The use of emulsifier improves surface appearance of the product.

The composition can also contain a carbon black, generally a furnace black, as a colorant, to improve the physical properties, and as a UV stabilizer. The amount of carbon black used is generally about 2.5% by weight.

Figure 2:
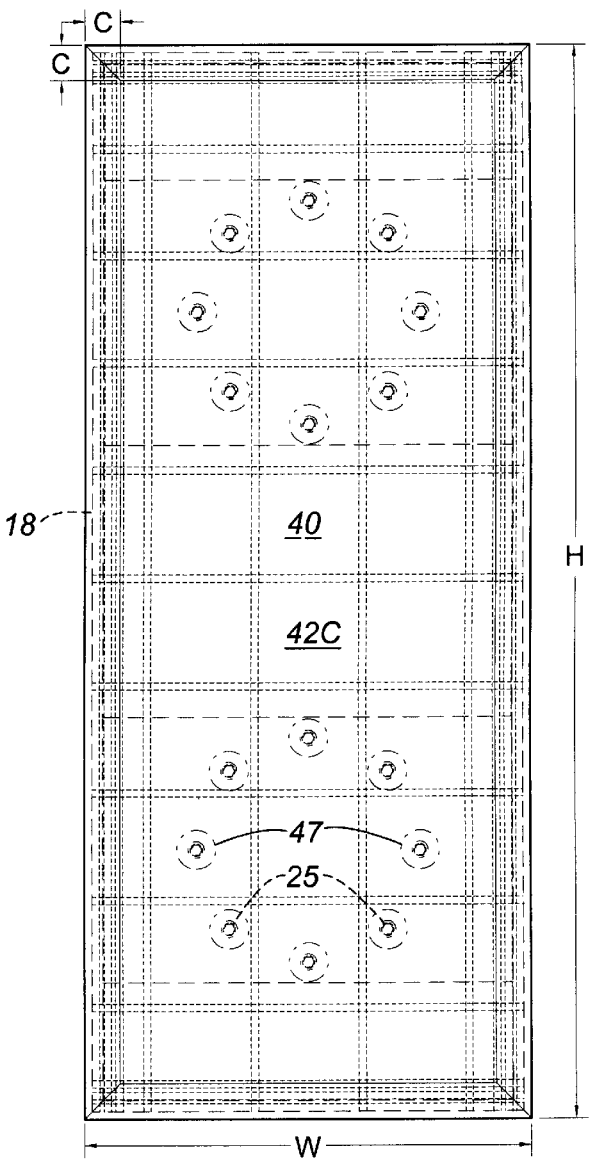
FIG. 2 is a front elevation view of the fender panel of FIG. 1.
Figure 3:
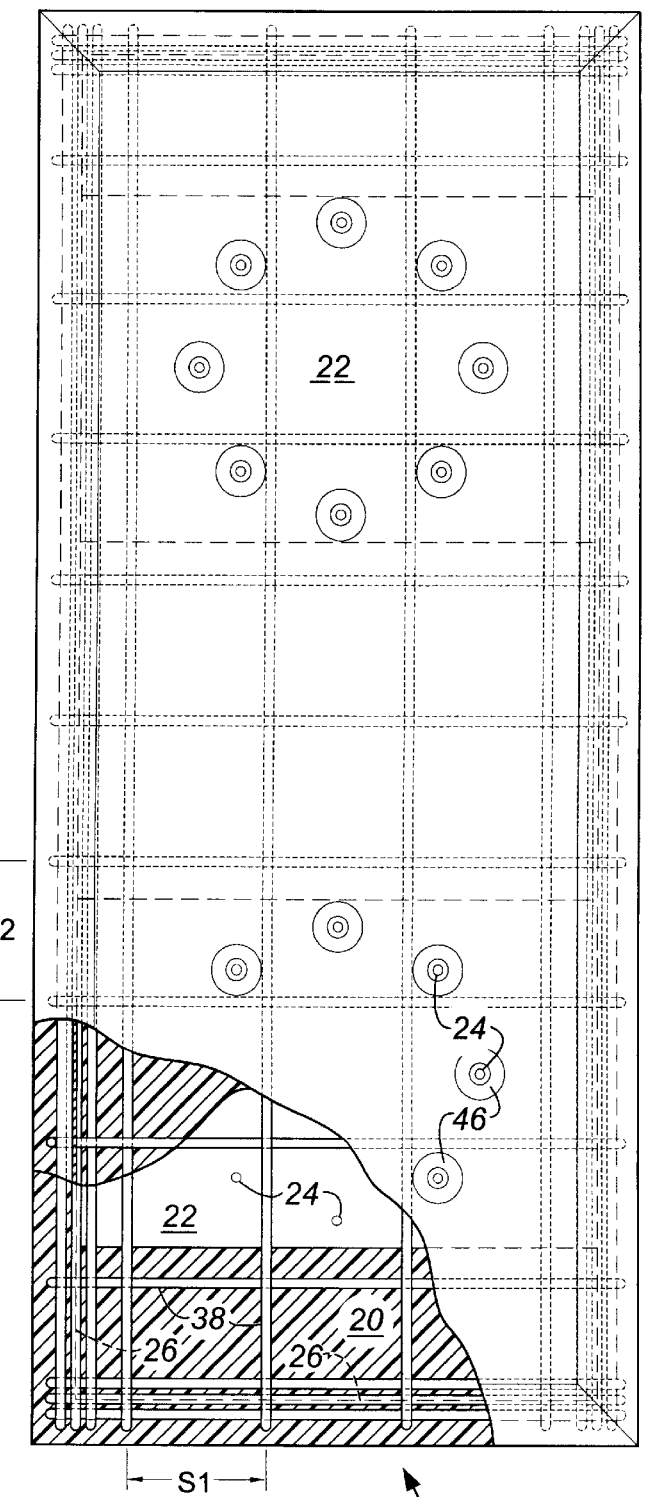
FIG. 3 is a front view showing the fender panel of FIG. 1 partially cut away.
Figure 5:
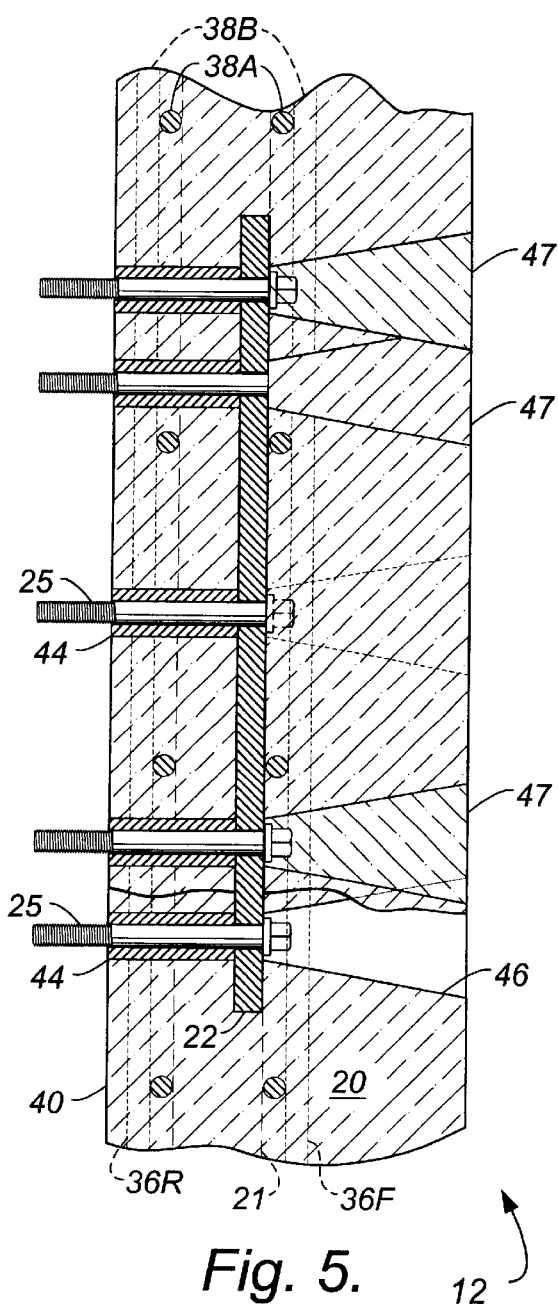
FIG. 5 is a fragmentary sectional detail view within region 5 of FIG. 1 showing the fender panel in final stages of assembly.

In a typical configuration, the composite panel 12 is generally rectangular and having a width W, a height H, and a thickness T as shown in FIGS. 1 and 2. A rear surface 40 of the panel is generally planar, a front surface 42 having a planar central region 42C and beveled perimeter region 42P. The resilient body 20 has a thickness T1 between the front surface central region 42C and the longitudinal reinforcing members 38B of the front grid 36F. Also encapsulated in the composite panel 12 are respective stand-off spacer sleeves 44 that are aligned with corresponding ones of the fastener openings 24 as shown in FIG. 5, each of the spacer sleeves 44 extending between the plate 22 and the rear surface 40 for rigidly spacing the frame 21 from the support 16 when the composite panel 12 is attached thereto by the fasteners 25. The resilient body 20 is formed with cone-shaped cavities 46 concentric with the mounting holes 24 and extending from the plate 22 and the front surface 42 for receiving the fasteners 25 during assembly with the support 16. After the fasteners 25 have been securely tightened, each of the cavities 46 is filled with a plug 47 of resilient material which can be the same material as that of the body 20. In the assembled condition of the fender assembly 10, a substantially effective seal is formed at the rear surface 40 of the composite panel 12 by pressure contact against the support 16 when the fasteners 25 are tightened. Thus the fasteners 25 and the entirety of the cage-frame 18 are fully encapsulated by the material of the resilient body 20 in combination with the support 16 (to the extent that the support 16 sealingly engages threaded extremities of the fasteners 15). In that respect, it is contemplated that the support 16 includes a metal collar having threaded engagement with the fasteners 25, the collar being encapsulated within resilient material of the support except for openings to respective threaded holes of the collar for receiving the fasteners 25.

In the exemplary configuration shown in the drawings, the height H is on the order of 3 meters, the width W is on the order of 1.6 meters, and the thickness T is on the order of 0.4 meters, the frame 21 incorporating a spaced pair of the plates 22 for support of the composite panel 12 by a vertically spaced pair of the supports 16. The frame members 26 and the cross members 32 are formed of 4-inch standard structural steel channel, and the reinforcing members 38 are lengths of 1-inch diameter reinforcing bar, the spacings s1 and S2 being on the order of 0.3 meter. The thickness T1 of the resilient body 20 between the front surface central region 42C and the front grid 36F is approximately 18 cm. It will be understood that the actual dimensions of the various components of the cage-frame 18 are determined by expected impact loading to be encountered, and the thickness T1 can range from approximately 5 cm up to approximately 1.5 meters.

Figure 6:
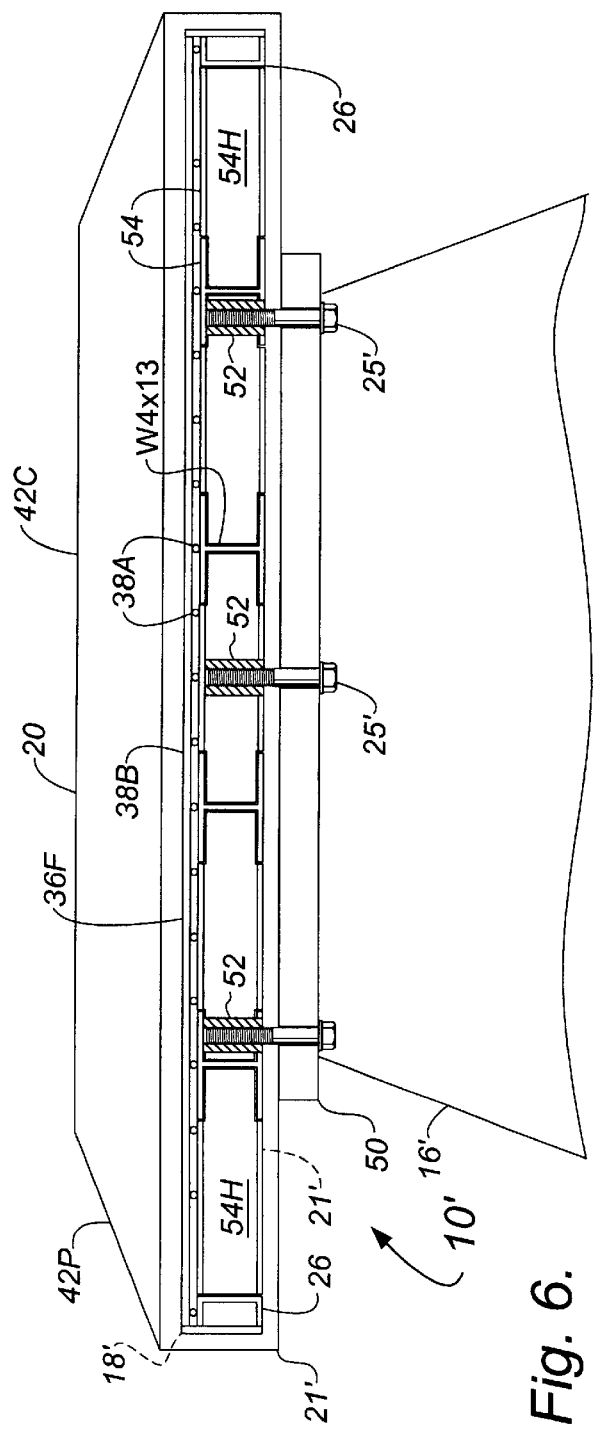
FIG. 6 is a plan sectional view showing a fender assembly including an alternative configuration of the composite fender panel of FIG. 1.
Figure 8:
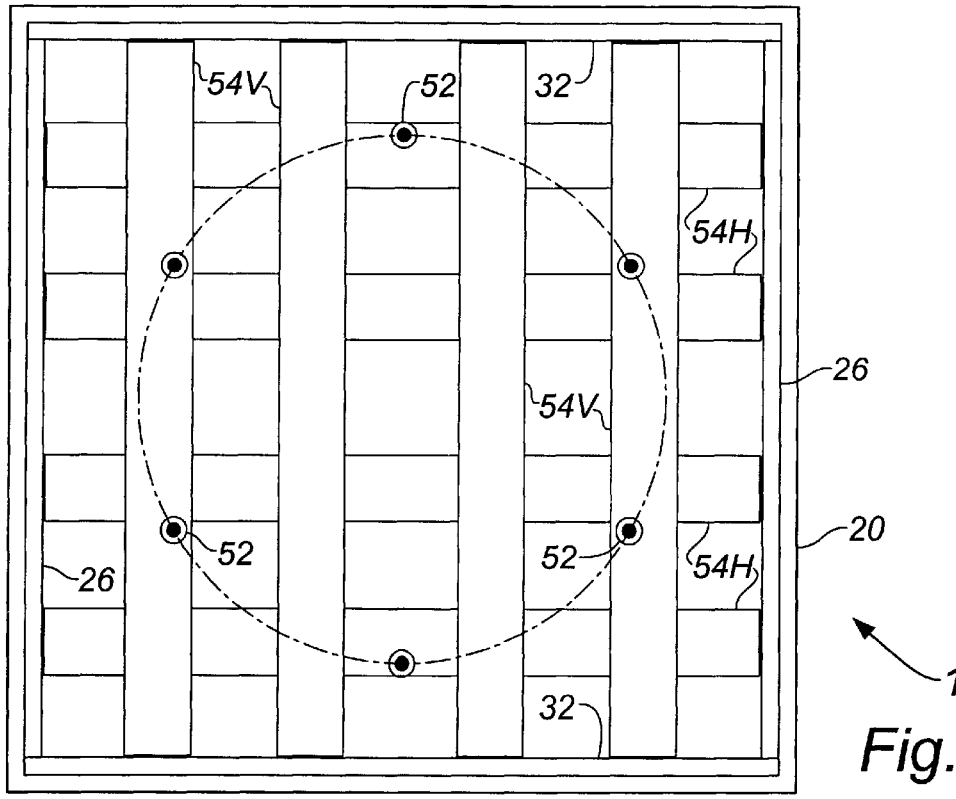
FIG. 8 is a rear view of the composite fender of FIG. 6, showing a frame portion of the internal cage-frame thereof.
Figure 7:
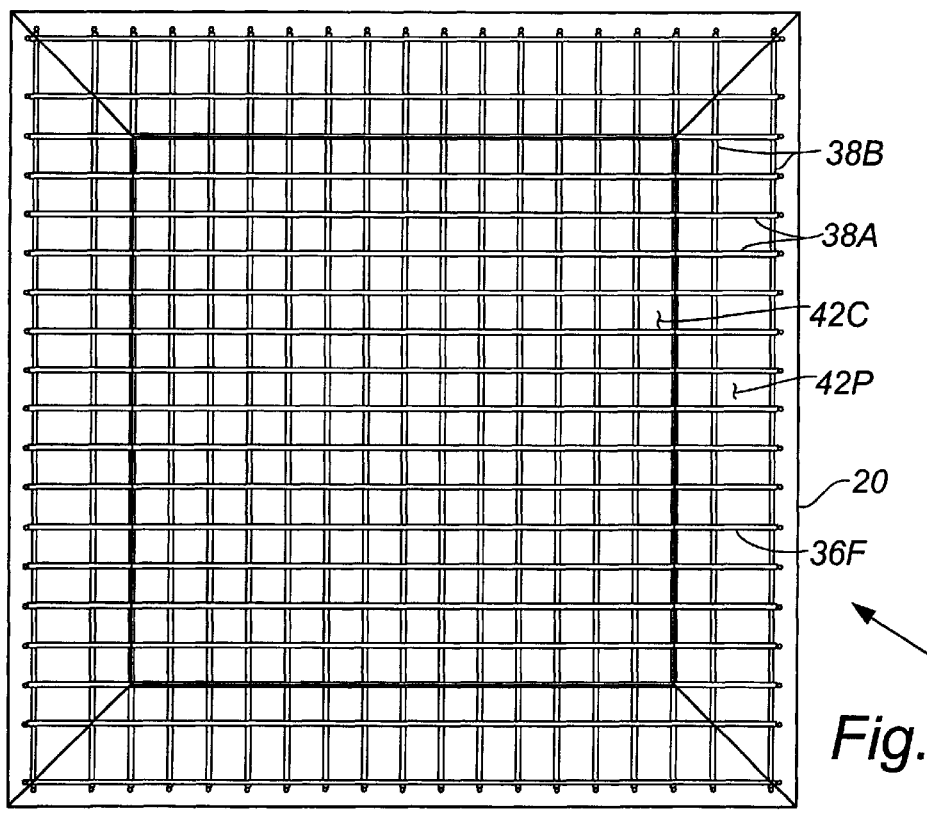
FIG. 7 is a front view of the composite fender panel of FIG. 6 showing an front grid portion of an internal cage-frame thereof.

With further reference to FIGS. 6–8, an alternative configuration of the fender assembly, designated 10', has a counterpart of the composite panel, designated 12' mounted on a counterpart of the support, designated 16'. Stainless-steel counterparts of the fasteners, designated 25', are inverted and extend forwardly through an outwardly projecting flange 50 of the support 16', threadingly engaging respective threaded sleeves 52 that are rigidly supported within a counterpart of the cage-frame, designated 18' as further described below. As also shown in FIG. 6, the cage-frame 18' includes a counterpart of the front grid 36F, but not the rear grid 36R, a counterpart of the frame, designated 21', being augmented by a plurality of beam members 54 including vertical beam members 54V and horizontal beam members 54H that are rigidly supported within counterparts of the longitudinal frame members 26 and the cross members 32. As in the configuration of FIGS. 1–5, the frame members 26 and the cross members 32 can be structural steel channels that define respective front and rear faces 34F and 34R. The beam members 54 can be structural beams such as I-beams and WF beams, WF beams being shown in the drawings as standard W4×13 members, the various members being rigidly welded together. Also, the horizontal beam members 54H are segmented and notched for projecting between respective flanges of the vertical beam members 54V to be flush with the front and rear faces 34F and 34R of the frame 21'. It will be understood that the vertical frame members 54V can be segmented instead of the horizontal frame members 54H, and that the beam members 54 can be arranged in two layers without segmenting. The threaded sleeves 52 project through respective openings that are formed in flanges of the beams 54, being securely welded in place.

Figure 9:
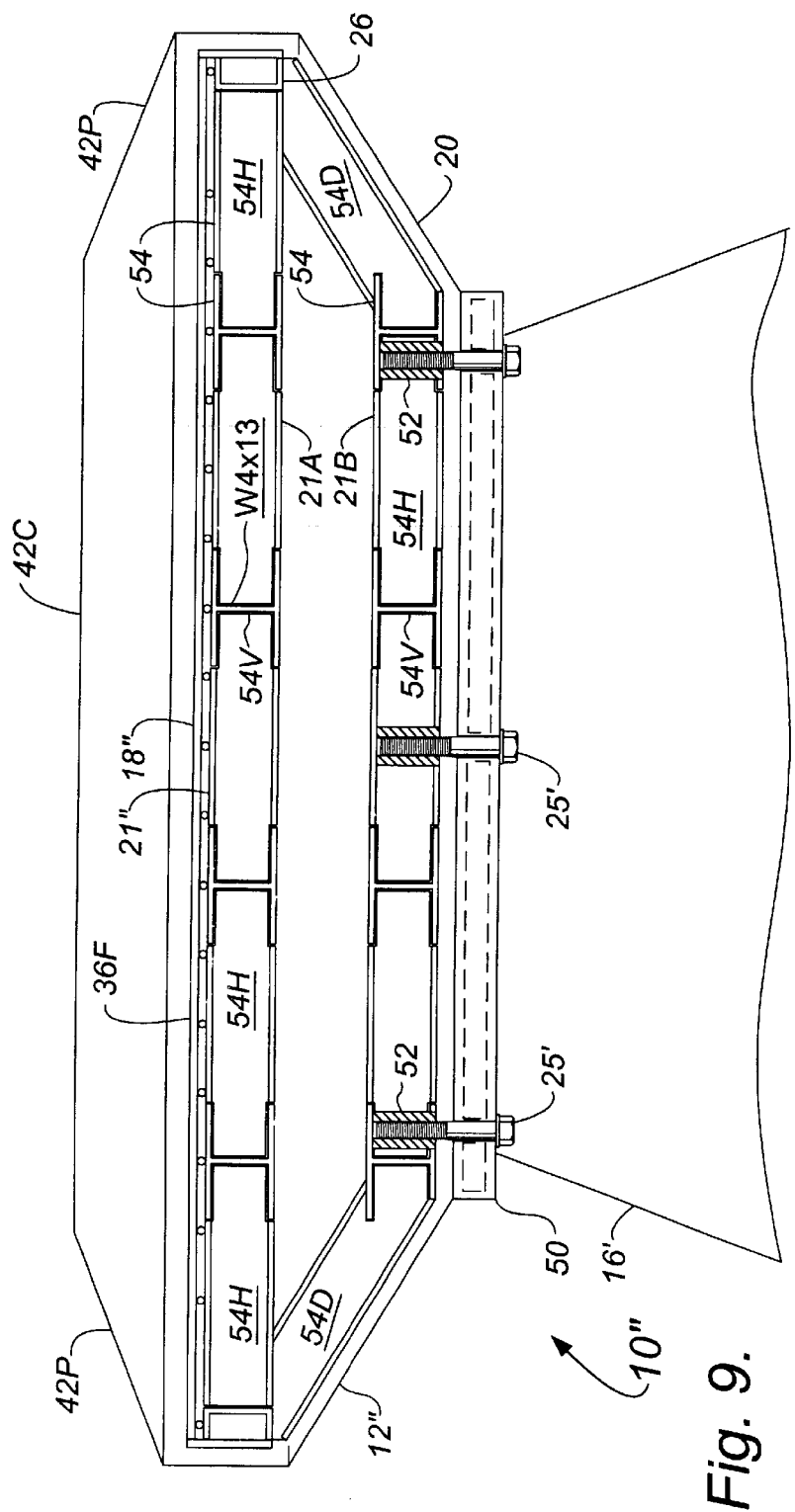
FIG. 9 is a plan sectional view showing an alternative configuration of the composite fender panel of FIG. 6.

With further reference to FIG. 9, another alternative configuration of the fender assembly, designated 10", has greatly enhanced strength for resisting more severe lateral loading by contacting large vessels. A counterpart of the composite panel 12', designated 12" and having increased thickness, is mounted to a counterpart of the support 16' of FIG. 6. A counterpart of the cage-frame 18', designated 18", includes a space-frame 21" having a front frame section 21A and a rear frame section 21B that is rigidly connected thereto in parallel-spaced relation by a plurality of diagonal frame members 54D. The front frame section 21A corresponds to the frame 21' of FIGS. 6–8 but without the threaded sleeves 52, whereas the rear frame section 21B corresponds to a central portion of the frame 21, including the threaded sleeves 54. The spacing between the frame sections 21A and 21B is selected such that the combination of the frame 21" with the front grid 36F provides an effective bending strength of the panel 12" sufficient to transmit the more severe loading contemplated for the fender assembly 10".

Figure 10:
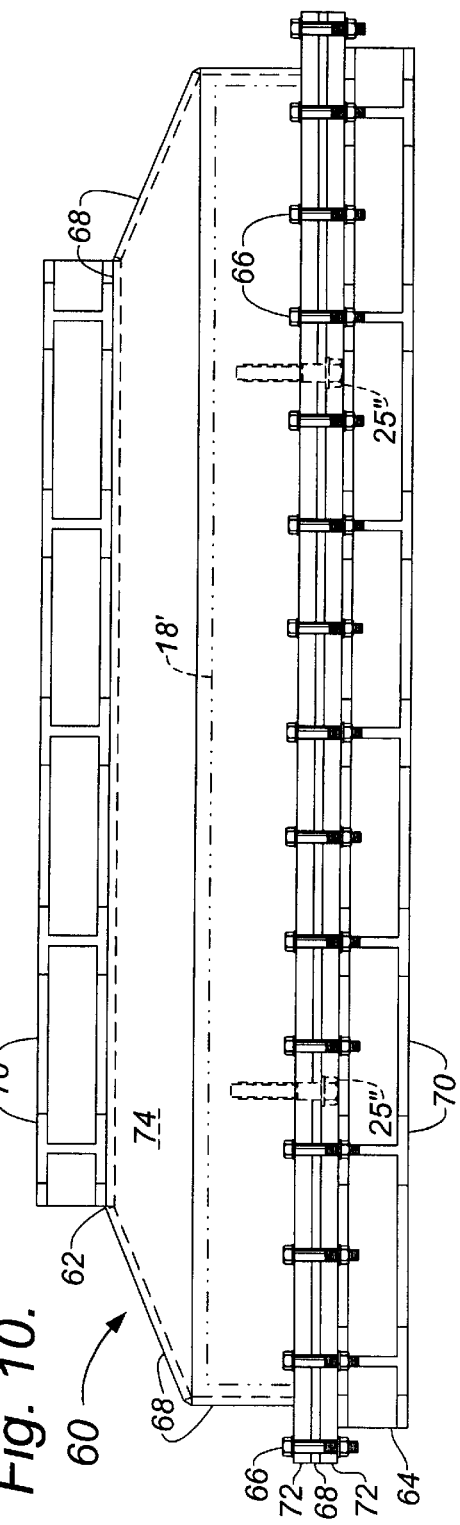
FIG. 10 is a plan view of a mold assembly for forming the composite fender panel of FIG. 6.
Figure 12:
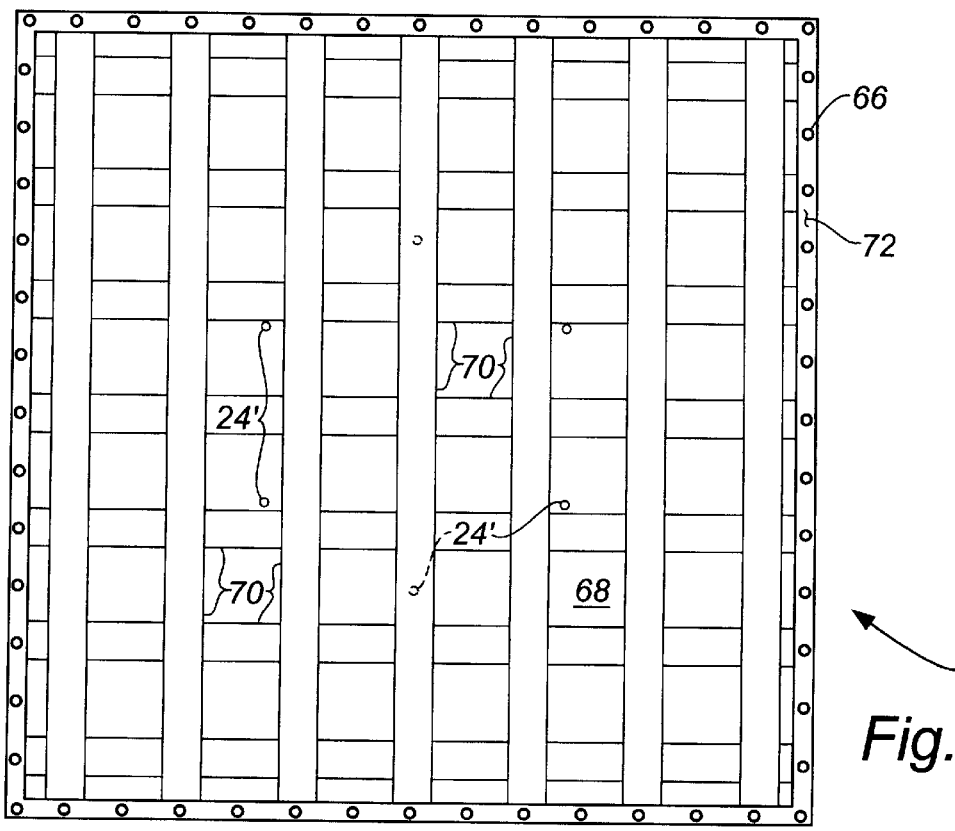
FIG. 12 is a rear view of the mold assembly of FIG. 10.
Figure 11:
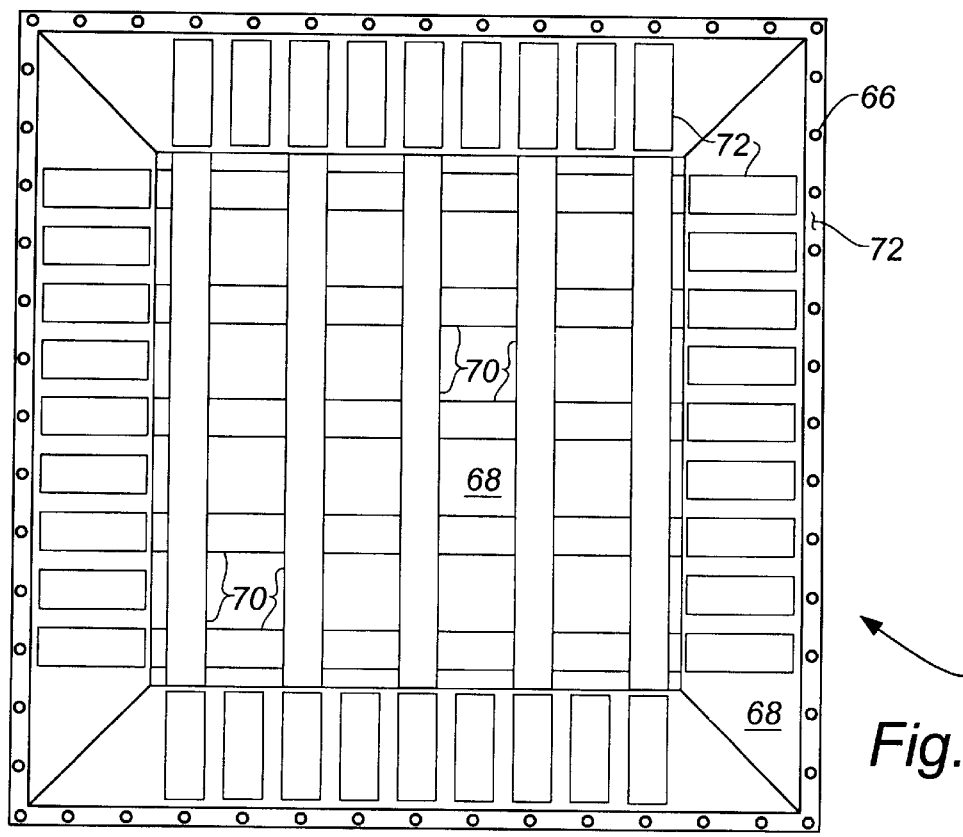
FIG. 11 is a front view of the mold assembly of FIG. 10.

With further reference to FIGS. 10–12, a mold assembly 60 for encapsulating the cage-frame 18' to form the composite panel 12' of FIGS. 6–8 includes a flanged front mold shell 62, and a flanged rear mold wall 64, the shell 62 and the wall 64 being sealingly joined by a set of mold fasteners 66. The mold assembly 60 is characterized by robust construction in view of anticipated molding pressures on the order of 350 psi. The mold assembly 60 also incorporates a conventional extruder inlet and an air exhaust port (not shown). In an exemplary configuration as shown in the drawings, the mold shell 62 and wall 64 are each weldments of steel mold plates 68, reinforcing beams 70, and flange members 72, the shell 62 also having reinforcing plates 72 in areas forming the perimeter region 42P of the panel 12P. The inside dimensions of the mold assembly 60 correspond to like dimensions of the panel 12', but with suitable allowances for shrinkage of the material forming the body 20. Counterparts of the fastener openings, designated 24', are formed on the plate 68 of the rear mold wall for supporting the cage frame 18' during molding. If necessary, portions of the reinforcing beams 70 can be removed for clearing fasteners used for that purpose. Suitable material for the plates 68 is mild steel of 0.5 inch thickness; the reinforcing beams 70 can be conventional steel beams, A.I.S.C. 4 WF 13 shapes (having a 4.0 inch section depth and weighing 13 pounds per foot) being shown. The flange members 72 can be 1-inch by 2-inch mild steel bars, and the reinforcing plates 72 can be mild steel of 0.5 inch thickness, approximately 12 inches long and 4 inches wide. It will be understood that other configurations of the mold assembly 60 can provide the needed stiffness and strength against molding pressure, including different thicknesses of the plates 68 and other arrangements of the reinforcing beams 70, which can also extend diagonally in place of the reinforcing plates 72.

Also shown in FIG. 10 is the cage 18' centered within a main cavity 74 of the mold assembly 60, being supported by counterparts of the fasteners, designated 25" that are inserted through the fastener openings 24'. More particularly, the mold assembly is preferably inverted so that the cage frame 18' is suspended in spaced relation to the rear mold wall by the fasteners 25". It will be understood that when molding the composite panel 12 of FIGS. 1–5, the fasteners 25" also locate the spacer sleeves 44 during molding; also, the fasteners 25" can threadingly engage respective mold inserts (not shown) for forming the cavities 46.

Figure 13:
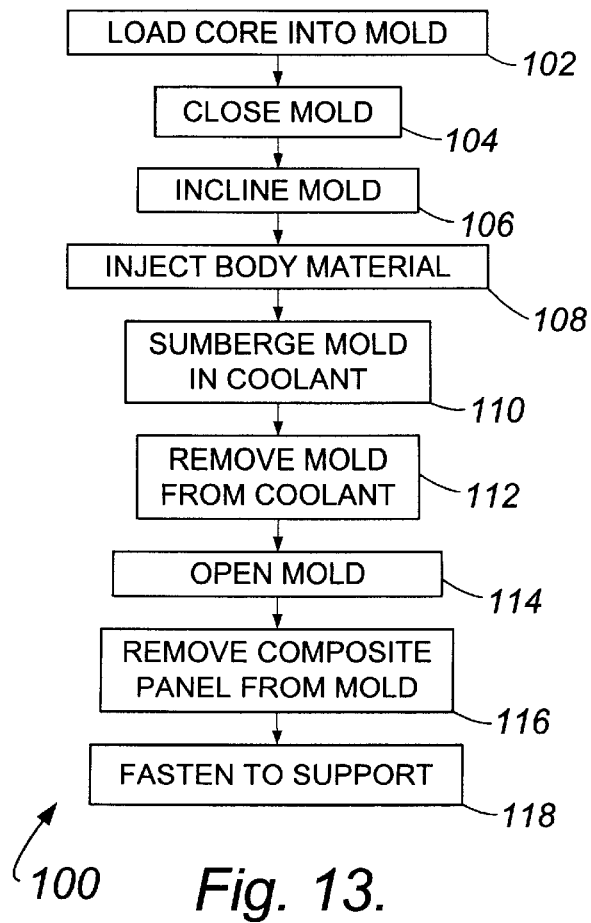
FIG. 13 is a flow chart for a process of fabricating the composite fender panel of FIG. 6.

With further reference to FIG. 13, a molding process 100 for forming the panel 12 includes a load mold step 102 wherein the cage-frame 18' is mounted to the rear mold wall 64 using the fasteners 25". Then, the mold shell 62 is fastened to the mold wall 64 in a close mold step 104 and, optionally in an incline mold step 106, the mold assembly 42 is propped up on a suitable support for elevating one or more exhaust vents (not shown).

Next, the material of the resilient body 20 is fed into the main cavity 60 in an inject body step 108. Then in a cooling step 110, the mold assembly 60 with its contents is submerged in cooling water for solidifying the material of the plastic body 20, after which the assembly 60 is removed from the water (step 112), and the mold assembly 60 is opened (step 114). The fasteners 25" are removed, and the substantially complete fender panel 12' is taken from the rear mold wall 64 (step 116); and the panel 12' is assembled with the resilient support 16 (step 118).

Figure 14:
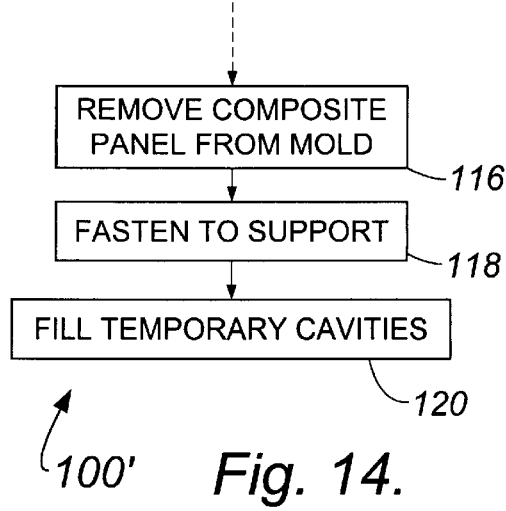
FIG. 14 shows an alternative configuration of the flow chart of FIG. 13.

With further reference to FIG. 14, an alternative counterpart of the molding process for the configuration of the fender assembly 10 of FIGS. 1–5 is designated 100', wherein, following the fastening step 118, exposed head portions of the fasteners 25 and adjacent portions of the plate 22 are sealed in a fill cavities step 120 by first surface-heating the plugs 47 and the cavities 46 using suitable means such as the flame of an acetylene torch, and pressing the plugs 47 into the cavities 46 flush with the front surface 42 of the fender panel 12.

As described above, FIG. 5 shows one of the cavities 46 prior to filling, and others of the cavities having been filled with corresponding plugs 47.

If desired or needed, the cage-frame 18 (18' or 18") and/or the mold assembly 60 can be preheated to be certain that the plastic material of the resilient body 20 flows to the exhaust port(s) of the mold assembly 60 and completely fills the main cavity 74.

Figure 15:
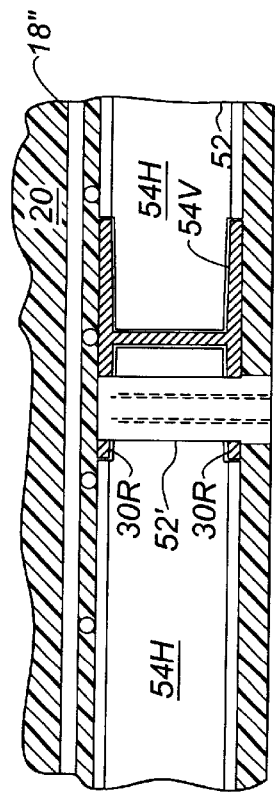
FIG. 15 is a fragmentary sectional view showing an alternative configuration of a boss portion of the composite fender panel of FIGS. 6–8.

With further reference to FIG. 15, alternative counterparts of the threaded sleeves, designated 52', are extended to the rear of the rear flanges 30R for augmenting lateral stability of the fender assembly 10' by reinforcing the fasteners 25'. In the exemplary and preferred configuration of FIG. 15, the sleeves 52' are fully flush with the rear surface 40, it being further preferred that the sleeves 52' be formed of stainless steel for preventing corrosion in case of water leakage between the support 16' and the rear surface 40. Similarly, the spacer sleeves 44 in the configuration of FIGS. 1–5 can also be formed of stainless steel.

The fender assembly 10 of the present invention is immune to marine borer attack, and thus requires no further protection, such as creosote or plastic sheathing, being practically maintenance free. The fender panel 12 is abrasion resistant, and thus has excellent effectiveness as a marine fender without any added protective covering.

The composite fender panel 12 is chemically inert, so it can last indefinitely. It does not react with sea water, is corrosion free, is substantially immune to the effects of light, is not bothered by most petroleum products, and is not subject to dry rot. Because it can be made with recycled plastic, it is an environmentally sound investment.

In some military based naval applications, it is undesirable for a wharf fender to be electro-magnetically sensitive. In such applications the cage-frame 18 can be formed with non-magnetic materials, such as carbon-reinforced plastic. The cage-frame 18 can also be developed by using fiberglass reinforcing rods and shapes, with reinforced epoxy joints at points of contact between the reinforcing members 38, between the lateral members 38A and the frame 21, as well as between elements of the frame 21.

Although the present invention has been described in considerable detail with reference to certain preferred versions thereof, other versions are possible. For example, the plate 22 in the configuration of FIGS. 1–5 can be displaced rearwardly to the rear face 34R of the frame 21. Also, the composite panel can have other shapes than rectangular, including hexagonal, octagonal, trapezoidal, and rounded, for example. Therefore, the spirit and scope of the appended claims should not necessarily be limited to the description of the preferred versions contained herein.

What is claimed is:

1. A composite fender panel for protecting a harbor structure, comprising:
    (a) a resilient body member having a front surface and a rear mounting surface; and
    (b) a cage frame encapsulated within the body member and including an attachment structure connected to plural spaced apart locations of the cage frame, the attachment structure defining a spaced plurality of attachment elements, the cage frame being spaced from the front surface by not less than 10 percent of a panel thickness of the body member between the front surface and the rear mounting surface.

2. The composite fender panel of claim 1, wherein the cage frame comprises a grid of rod members.

3. The composite fender panel of claim 2, wherein the rod members are steel reinforcing rods having gripping projections formed thereon.

4. The composite fender panel of claim 3, wherein the rod members have a nominal cross-sectional diameter being not more than 10 percent of the panel thickness.

5. The composite fender panel of claim 3, wherein the grid of the cage-frame has welded connections at respective intersections thereof.

6. The composite fender panel of claim 2, wherein the grid is a front grid, the cage frame further comprising a rear grid of rod members and a spacer structure connecting portions of the grids in rigidly spaced relation.

7. The composite fender panel of claim 6, wherein the attachment structure is rigidly connected to the spacer structure.

8. The composite fender panel of claim 6, wherein the attachment structure comprises a plate member, the attachment elements being respective fastener openings extending through the plate member.

9. The composite fender panel of claim 8, wherein the plate member is parallel-spaced from the mounting surface, the attachment structure further comprising a plurality of tubular spacers extending between the plate member and the mounting surface, each of the spacers being aligned with a respective fastener opening for receiving a corresponding threaded fastener.

10. The composite fender panel of claim 6, wherein the spacer structure is a rectangular frame having pairs of side and end frame members.

11. The composite fender panel of claim 10, wherein the attachment structure comprises a plate member, the attachment elements being respective fastener openings extending through the plate member, the plate member being welded to each of the side frame members.

12. The composite fender panel of claim 10, wherein the frame members are each formed having a uniform cross-section including a spaced pair of flange portions and a connecting web portion, the flange portions forming respective front and rear faces of the frame.

13. The composite fender panel of claim 10, wherein each of the grids includes respective pluralities of lateral and longitudinal rods, at least some of the lateral rods being connected to the side frame members, each of the longitudinal rods being connected to the at least some of the lateral rods in spaced relation opposite the frame.

14. The composite fender panel of claim 2, wherein the front surface includes a planar main portion and a tapered perimeter portion, a cushion thickness of the resilient body between the main portion of the front surface and the cage frame being at least 30 percent of the panel thickness.

15. The composite fender panel of claim 14, wherein the cushion thickness is at least 0.15 meters.

16. The composite fender panel of claim 14, wherein the resilient body consists of a main polymeric component and an additive component, the main polymeric component consisting of low-density polyethylene of which at least 35 percent is linear low-density polyethylene, the additive component including an effective amount of an ultraviolet inhibitor.

17. The composite fender panel of claim 16, wherein the main polymeric component is at least 90 percent of the resilient body, the resilient body including not more than 5 percent by weight of high-density polyethylene.

18. The composite fender panel of claim 16, wherein the main polymeric component is at least 65 percent linear low-density polyethylene.

19. The composite fender panel of claim 1, wherein the cage-frame further comprises a frame having a plurality of first beams and a plurality of second beams rigidly connected to the first beams in orthogonal relation thereto.

20. The composite fender panel of claim 19, wherein the cage frame further comprises a grid of first and second rod members, at least some of the first rod members being connected to a front face of the frame, each of the second rod members being connected to the at least some first rod members in spaced relation opposite the front face of the frame.

21. The composite fender panel of claim 19, wherein the first and second beams are joined in coplanar relation.

22. The composite fender panel of claim 21, wherein at least some of the second beams are segmented, each segment extending between a pair of the first beams.

23. The composite fender panel of claim 21, wherein the beams are each formed having a uniform cross-section including front and rear flange portions and a connecting web portion, the flange portions forming respective front and rear faces of the frame.

24. The composite fender panel of claim 23, wherein the attachment elements are formed in respective boss members, each of the boss members being rigidly connected between respective front and rear flanges of one of the beams.

25. The composite fender panel of claim 24, wherein each of the boss members is threaded for engaging a threaded fastener.

26. The composite fender panel of claim 24, wherein each of the boss members projects rearwardly from the rear flanges of the beams for reinforcing respective threaded fasteners.

27. The composite fender panel of claim 26, wherein the boss members extend flush with the rear mounting surface of the body member, the boss members being formed of corrosion resistant steel.

28. The composite fender panel of claim 24, wherein each of the boss members is spaced from the mounting surface, a passage being formed for the fastener between the boss member and the mounting surface whereby, when the fasteners are tightened against a support that contacts the mounting surface, the body member is compressed about the fasteners between the mounting surface and the bosses for sealing same.

29. The composite fender panel of claim 24, wherein each of the boss members is formed with a passage therethrough for receiving a threaded fastener, a cavity being formed between the boss and the front surface of the resilient body for receiving a head of the fastener and a plug for encapsulating the head of the fastener.

30. The composite fender panel of claim 19, wherein the frame includes a front portion and a rear portion connected in parallel-spaced relation thereto by a plurality of third beams.

31. A composite fender assembly comprising:
    (a) a composite fender panel according to claim
    (b) a resilient support member for mounting the fender panel in resiliently spaced relation to a wharf face, the support member having a plurality of threaded fastener cavities formed in a support surface thereof; and
    (c) a plurality of threaded fasteners connecting respective fastener elements of the fender panel to the support member for rigidly holding the mounting surface of fender panel against the support surface of the support member.

32. The composite fender assembly of claim 31, wherein the fastener elements are formed with respective fastener openings and the resilient body is initially formed with a plurality head cavities extending between respective fastener openings and the front face, each of the head cavities tapering continuously inwardly between the front face and the corresponding fastener element, a resilient plug member being sealingly bonded within the cavity and forming a portion of the front face.

33. The composite fender assembly of claim 32, wherein the plug member is adhesively bonded within the cavity.

34. The composite fender assembly of claim 32, wherein the plug member is bonded within the cavity by thermal fusing with the resilient body.

35. The composite fender assembly of claim 31, wherein the fastener elements are formed as respective threaded openings in the attachment structure for engaging corresponding ones of the threaded fasteners.

36. A method for forming a composite fender panel, the method comprising:
    (a) forming a cage frame including a spaced plurality of attachment elements;
    (b) encapsulating the cage frame in a resilient material forming a resilient body having a front surface and a rear mounting surface, the resilient material being formed for accessing the attachment elements.

37. The method of claim 36, further comprising providing an openable mold assembly having front and rear mold elements for respectively defining the front surface and the rear mounting surface, and supporting the cage frame within the mold assembly by a plurality of threaded fasteners engaging respective ones of the attachment elements.

38. The method of claim 37, wherein the attachment elements are threaded, the fasteners threadingly engaging the attachment elements during the encapsulating.

39. The method of claim 36, wherein the cage frame includes a grid of reinforcing rods extending over a front face of the frame, the grid including first rods being connected to the frame at the front face of the frame and second rods connected to front edge portions of the first rods.

40. The method of claim 36, wherein the cage frame includes a frame having a plurality of intersecting beam members.

41. The method of claim 40, wherein the attachment elements include respective fastener openings.

42. The method of claim 41, further comprising, prior to the encapsulating, assembling respective spacer sleeves against the frame in registration with corresponding ones of the fastener openings, the spacer sleeves being encapsulated flush with the mounting surface in the encapsulating of the cage frame.

43. The method of claim 41, wherein the encapsulating includes forming respective passages extending from the mounting surface to the fastener openings.

44. The method of claim 41, wherein the encapsulating further includes forming respective head cavities in the body between the front surface and the fastener openings for accessing the fastener openings.

45. A method for making a composite protective fender assembly, comprising:
    (a) forming the composite fender panel as claimed in claim 44;
    (b) providing a resilient support member having a plurality of threaded fastener cavities formed in a supporting surface thereof;
    (c) fastening the fender panel against the supporting surface using headed fasteners extending from respective head cavities, through the fastener openings, and into engagement with corresponding ones of the threaded cavities; and
    (d) sealingly filling the head cavities using respective resilient plug members.

46. A composite fender panel for protecting a harbor structure, comprising:
    (a) a resilient body member having a front surface including a planar main portion and a tapered perimeter portion, and a rear mounting surface spaced by a panel thickness from the main portion of the front surface; and (b) a cage frame encapsulated within the body member, the cage frame including:
  (i) a frame having a plurality of first and second beams, each beam having a uniform cross-section including front and rear flange portions and a connecting web portion, at least some of the flange portions forming respective front and rear faces of the frame;
  (ii) a grid of steel reinforcing rods having gripping projections formed thereon, the rods also having a nominal cross-sectional diameter being not more than 10 percent of the panel thickness, the grid including respective pluralities of first and second rods, the first rods being welded to the front face of the frame, each of the second rods having welded connections to the first rods in spaced relation opposite the front face of the frame; and
  (iii) an attachment structure defining a spaced plurality of attachment elements formed in respective boss members, each of the boss members being rigidly connected between respective front and rear flanges of one of the beams,
  a cushion thickness of the resilient body between the main portion of the front surface and the cage frame being at least 30 percent of the panel thickness of the body member.

47. The composite fender panel of claim 46, wherein the boss members are formed with respective mounting faces being flush with the rear mounting surface.

\* \* \* \* \*